US009910982B2

(12) United States Patent
Chow et al.

(10) Patent No.: US 9,910,982 B2
(45) Date of Patent: Mar. 6, 2018

(54) LARGE-SCALE, TIME-SENSITIVE SECURE DISTRIBUTED CONTROL SYSTEMS AND METHODS

(71) Applicant: North Carolina State University, Raleigh, NC (US)

(72) Inventors: Mo-Yuen Chow, Cary, NC (US); Wente Zeng, Cary, NC (US)

(73) Assignee: North Carolina State University, Raleigh, NC (US)

( * ) Notice: Subject to any disclaimer, the term of this patent is extended or adjusted under 35 U.S.C. 154(b) by 61 days.

(21) Appl. No.: 14/889,840

(22) PCT Filed: May 21, 2014

(86) PCT No.: PCT/US2014/038915
§ 371 (c)(1),
(2) Date: Nov. 7, 2015

(87) PCT Pub. No.: WO2014/193708
PCT Pub. Date: Dec. 4, 2014

(65) Prior Publication Data
US 2016/0117505 A1  Apr. 28, 2016

Related U.S. Application Data

(60) Provisional application No. 61/827,585, filed on May 25, 2013.

(51) Int. Cl.
*G06F 21/55* (2013.01)
*H04L 12/26* (2006.01)
(Continued)

(52) U.S. Cl.
CPC ............ *G06F 21/552* (2013.01); *H04L 43/00* (2013.01); *H04L 63/1425* (2013.01);
(Continued)

(58) Field of Classification Search
None
See application file for complete search history.

(56) References Cited

U.S. PATENT DOCUMENTS

| 2003/0149888 A1 | 8/2003 | Yadav | |
|---|---|---|---|
| 2004/0133640 A1* | 7/2004 | Yeager | G06F 9/4862 709/204 |

(Continued)

FOREIGN PATENT DOCUMENTS

KR    20070109527 A    11/2007

OTHER PUBLICATIONS

Zhang et al.; RADAR: a ReputAtion-based Scheme for Detecting Anomalous Nodes in WiRless Mesh Networks; 2008; Retrieved from the Internet <URL: http://ieeexplore.ieee.org/abstract/document/4489491/>; pp. 1-6 as printed.*

(Continued)

*Primary Examiner* — Saleh Najjar
*Assistant Examiner* — Michael Chao
(74) *Attorney, Agent, or Firm* — Olive Law Group, PLLC (57) ABSTRACT

Large-scale, time-sensitive secure distributed control systems and methods are disclosed. According to an aspect, a method includes detecting an anomaly at a module among a plurality of modules in a network. The method also includes adjusting a reputation level of the module associated with the detected anomaly. Further, the method includes controlling interaction of the module associated with the detected anomaly within the network based on the adjusted reputation level.

20 Claims, 5 Drawing Sheets

(51) Int. Cl.
  *H04L 29/06* (2006.01)
  *H04L 29/08* (2006.01)
(52) U.S. Cl.
  CPC ...... *G06F 2221/034* (2013.01); *H04L 67/104* (2013.01); *H04L 67/1057* (2013.01)

(56) References Cited

U.S. PATENT DOCUMENTS

| | | |
|---|---|---|
| 2005/0262237 A1 | 11/2005 | Fulton et al. |
| 2009/0044265 A1 | 2/2009 | Ghosh et al. |
| 2011/0179164 A1* | 7/2011 | Memon ............ H04L 63/1441 709/224 |
| 2012/0209411 A1 | 8/2012 | Ohkado et al. |

OTHER PUBLICATIONS

Buchegger et al.; Self-Policing Mobile Ad-Hoc Networks by Reputation Systems; 2005; Retrieved from the Internet <URL: http://ieeexplore.ieee.org/abstract/document/1470831/>; pp. 1-7 as printed.*

Greitzer et al.; Predictive Modeling for Insider Threat Mitigation; 2009; Retrieved from the Internet <URL: http://www.pnl.gov/CogInformatics/media/pdf/TR-PACMAN-65204.pdf>; pp. 1-18 as printed.*

Oliviero et al.; REFACING: An autonomic approach to network security based on multidimensional trustorthiness; 2008; Retrieved from the Internet <URL: http://www.sciencedirect.com/science/article/pii/S1389128608001898>; pp. 1-19 as printed.*

Chen et al.; Integrated Social and QoS Trust-Based Routing in Delay Tolerant Networks; 2012; Retrieved from the Internet <URL: https://link.springer.com/article/10.1007/s11277-011-0351-2>; pp. 1-17, as printed.*

Notification of Transmittal of the International Search Report and the Written Opinion of the International Searching Authority, or the Declaration dated May 21, 2014 for PCT International Application No. PCT/US2014/038915.

International Preliminary Report on Patentability dated Dec. 1, 2015 issued for corresponding PCT Application No. PCT/US2014/38915.

Zeng, W., et al., "Secure Distributed Control in Unreliable D-NCS," 2012 IEEE International Symposium on Industrial Electronics (ISIE), pp. 1858-1863 (2012).

Zeng, W. and Chow, M. "Convergence and Recovery Analysis of the Secure Distributed Control Methodology for D-NCS," in Proceedings of 2013 IEEE International Symposium on Industrial Electronics (ISIE), pp. 1-6 (2013).

* cited by examiner

FIG. 5B

LARGE-SCALE, TIME-SENSITIVE SECURE DISTRIBUTED CONTROL SYSTEMS AND METHODS

CROSS REFERENCE TO RELATED APPLICATIONS

This application is a 35 USC 371 application of International PCT Patent Application No. PCT/US14/38915, filed May 21, 2014 and titled LARGE-SCALE, TIME-SENSITIVE SECURE DISTRIBUTED CONTROL SYSTEMS AND METHODS, which claims the benefit of and priority to U.S. Provisional Patent Application No. 61/827,585, filed May 25, 2013 and titled LARGE-SCALE, TIME-SENSITIVE SECURE DISTRIBUTED CONTROL SYSTEMS AND METHODS; all of the contents of which are hereby incorporated herein by reference in their entireties.

FEDERALLY SPONSORED RESEARCH OR DEVELOPMENT

The technology disclosed herein was made with government support under grant number ECS-0823952 awarded by the National Science Foundation (NSF). The United States government may have certain rights in the technology.

TECHNICAL FIELD

The present subject matter relates to large-scale, time-sensitive secure distributed control systems and methods.

BACKGROUND

Distributed Networked Control Systems (D-NCS) have been at the core of national critical infrastructures and industrial control systems for many decades (e.g., electrical power systems and transportation systems). While most D-NCS have been safe in the past, a few confirmed cases of cyber attacks have occurred. The recent presence of the infamous industrial control system malwares "Stuxnet" and "Flame" have brought significant attention to making industrial control systems safe from such malicious cyber attacks. Many D-NCS applications are time-sensitive, data-sensitive, and safety-critical. The potential consequences of compromising D-NCS can be devastating to public health and safety, national security, and the economy. Therefore, it is important to implement D-NCS with secure controls that make reliable, safe, and flexible performance possible.

D-NCS are increasingly more vulnerable to cyber attacks with the rapid advancements and uses of networking, embedded systems, wireless communication technologies, and novel control strategies. In particular, more and more distributed control algorithms are being used in D-NCS because of their flexibility, robustness, computation, and communication features. These algorithms, however, increase the vulnerability of D-NCS to malicious cyber attacks. In the absence of a centralized supervisory node that monitors the activities of the nodes in the network, distributed control strategies are prone to cyber attacks and component failures. Thus, it is increasingly important to guarantee that computations are secure and trustworthy even in the presence of misbehaving devices. Also, most of the current efforts for protecting D-NCS have been accomplished by prevention and are limited to communication security. There is an urgent growing need to protect control algorithms from malicious cyber attack.

One typical task in the NCS is to agree upon a certain performance measure for a group of agents, such as the work load on a network of parallel computers, the clock speed for wireless sensor networks, or the velocity or formation pattern for a group of autonomous vehicles. Several distributed control algorithms, such as consensus algorithms and gossip algorithms, have been proposed and studied in D-NCS to accomplish such tasks (e.g., formation control of multi-robot systems, time synchronization of wireless sensor networks). However, there is a need for improvements on reaching agreement in the presence of misbehaving agents.

In view of the foregoing, there is a continuing need for improved systems and techniques for securing D-NCS and other systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are large-scale, time-sensitive secure distributed control systems and methods. According to an aspect, a method includes detecting an anomaly at a module among a plurality of modules in a network. The method also includes adjusting a reputation level of the module associated with the detected anomaly. Further, the method includes controlling interaction of the module associated with the detected anomaly within the network based on the adjusted reputation level.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

The presently disclosed subject matter provides a system including distributed modules that are each configured to communicate with each other. Each module may be configured to implement a secure distributed control algorithm for execution by one or more of the modules as will be described in more detail herein. The modules may each be configured to communicate information about availability of communication links and information flows with one or more of its neighboring modules. The algorithm may provide information about security for the system and may provide secure control locally among the modules. Further, the modules may be configured to detect network inconsistencies. The modules may also be configured to identify cyber attacks and malicious operations among neighboring modules.

As disclosed herein, a module may be any independent physical system operating within a consensus network. The module may operate as an agent and includes two parts: a local controller and a consensus manager. The local controller may constantly or periodically report its information state to the consensus manager, among others, via communication within the network. The consensus manager may calculate a consensus result and pass it back to the local controller. Subsequently the local controller may report its new state to the consensus manager. This process may continue as the system operates, which may be an iterative process.

In accordance with embodiments of the present subject matter, a secure distributed control algorithm may be a linear consensus algorithm. In an example algorithm, the state of each node or module is updated at each time step, which is a weighted average of its own state and those received from its neighbor nodes or modules. In accordance with embodiments, all the nodes or modules may be assumed to cooperate and follow the protocol exactly. Thus, it may be important to ensure secure computation in the face of failures of and intrusions into the linear consensus algorithm.

Disclosed herein are secure distributed control methodologies. Further, disclosed herein is a convergence proof and illustration of the constraints and limitations of the proposed methods through convergence analysis. Two recovery schemes are disclosed that are added to ensure correct convergence of the secure distributed control methodology in the presence of misbehaving agents in leaderless consensus networks. Further, this disclosure provides a demonstration of the effectiveness of the proposed techniques through simulations.

The disclosed secure distributed control methodology can outperform conventional security mechanisms for consensus computation for the following reasons: (1) it is resilient to the single point of failure since no fusion node is required as a centralized intrusion detection scheme; (2) it relies only on each agent's own observations to avoid the new vulnerability of false accusations from second-hand information exchanges; and (3) it embeds the security mechanism as a feedback loop inside the consensus computation, making the secure distributed control algorithm itself resilient and robust to the presence of misbehaving agents.

The presently disclosed subject matter in accordance with one or more embodiments provides for the formation of autonomous mobile robots or modules using a linear consensus algorithm. The group of mobile robots may be represented by a leader-follower consensus network, where the followers update their positions using a local consensus procedure, while the leaders, whose positions represent the inputs of the network, are free to move. This is an example of applying distributed control in a networked multi-robot system. On the one hand, a multi-robot system represents a collection of agents in which each agent has limited knowledge of the state of the other agents and the environment. On the other hand, the robots can interact with other agents and environments according to their own dynamics, which determines their behaviors.

Figure 1A:
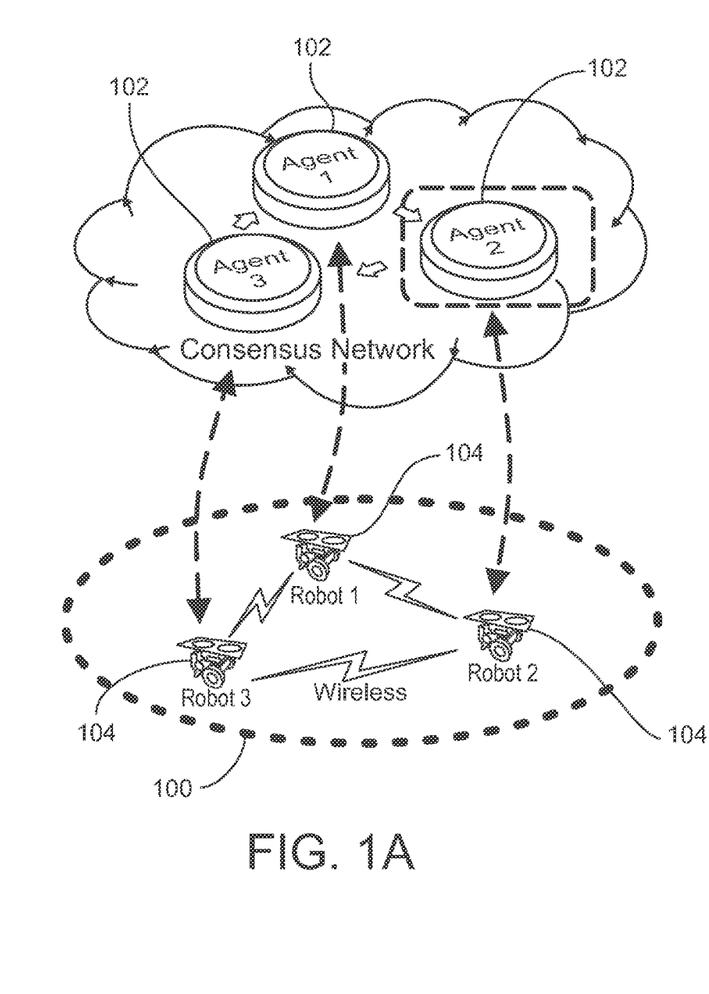
FIG. 1A is a diagram of an example framework of multi-agent distributed control in a D-NCS in accordance with embodiments of the present disclosure.

In accordance with embodiments, FIG. 1A illustrates a diagram of an example framework of multi-agent distributed control in a D-NCS 100 in accordance with embodiments of the present disclosure. Referring to FIG. 1A, a network of n agents 102 (corresponding to robots 104 in this example) may be considered whose identical linear dynamics (e.g., first order or second order dynamics) are denoted by:

$$x_i[k+1]=Ax_i[k]+Bu_i[k] \quad (1)$$

where $x_i$ and $u_i$ are the agent states and controls and i is the index for the agents in the network.

Each agent receives the following measurements:

$$y_i[k]=Cx_i[k] \quad (2)$$

and implements a reference-based proportional controller on-board:

$$u_i[k]=K_p e_i[k]=K_p(r_i[k]-y_i[k]), \quad (3)$$

where $r_i$ is the reference state and $K_p$ is the proportional gain for the P controller to be designed.

Figure 1B:
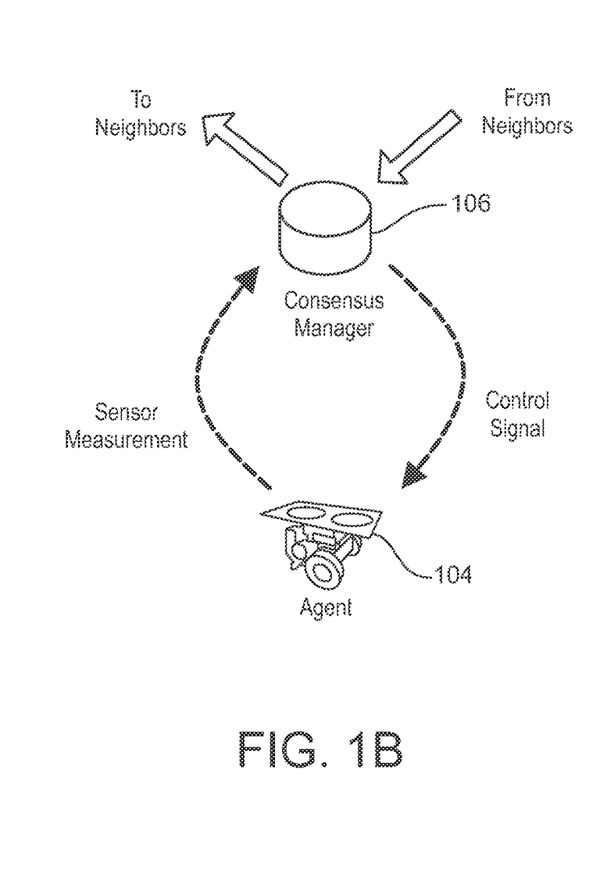
FIG. 1B is a diagram of an example configuration of an agent in accordance with embodiments of the present disclosure.

To reach consensus of these agents 102 cooperatively, the agents 102 can communicate with one another through wireless communications. As an example, the robots may be distributed modules with the D-NCS 100. In this neighbor-to-neighbor information exchange process, the first-order linear consensus algorithm is implemented in a consensus manager 106 of each agent 102. For example, FIG. 1B illustrates a diagram of an example configuration of an agent 102 in accordance with embodiments of the present disclosure. The consensus manager 106 may be implemented by hardware, software, firmware, or combinations thereof. For example, the consensus manager 106 may be implemented by one or more processors and memory having machine readable instructions for implementation by the processor(s). Further, the agents 102 may be suitably configured to communicate (e.g., wireless or wired communication) with neighboring agents.

At each time instant, each agent 102 updates its reference state as a weighted combination of its own current state and other measured states received from its neighbors, as shown in FIG. 1B. The reference state update rule in the consensus manager 106 of each agent 102 is listed below:

$$z_i(k) = y_i(k), \quad (4)$$

$$z_i[k+1] = \sum_{j=1}^{n} d_{ij} z_j[k], i = 1, \ldots, n, \quad (5)$$

$$r_i(k+1) = z_i(k+1), \quad (6)$$

where $d_{ij}$, the consensus computation weight, is the (i, j) entry of the row-stochastic matrix D and $z_i$ is the information transmitted in the communication layer.

By following the update rule described in (5), all agents 102 may converge to a common state asymptotically, and thus the consensus task can be completed in a distributed manner. The convergence rate is based on the topology of the system's communication network (graph G), which is the second smallest eigenvalue of the associated Laplacian matrix.

The misbehaving agent 102 in the D-NCS 100 may be modeled as one whose distributed controller (consensus manager) is suffering an unexpected fault or under a malicious cyber attack. The misbehaving agent 102 may be modeled in the system as:

$$z_i[k+1] = \sum_{j=1}^{n} d_{ij} z_j[k] + B_{i,M} u_{i,M}[k], \quad (7)$$

where $u_{i,M}$ is the anomaly factor that is modeled as an exogenous input to the consensus manager.

By the definition above, when the agent 102 is behaving well, the corresponding exogenous input $u_M$ is constantly equal to zero. When the agent is misbehaving, it is allowed to update its reference state in an arbitrary way by choosing different exogenous input $u_M$. Therefore, depending on the nature of various misbehaviors, the misbehaving agent 102 can be classified into two categories.

One type of misbehaving agent is the faulty agent, which simply stops to update its reference state and behaves like a stopping failure (e.g., out of power), thus the exogenous input $u_M$ can be modeled as:

$$u_M[k] = c - \sum_{j=1}^{n} d_{ij} z_j[k], \quad (8)$$

where c is an arbitrary constant value and c∈R.

Another type of misbehaving agent is the malicious agent, which means the agent is under malicious cyber attacks (e.g., false data injection attack, deception attack) and thus it may behave in an arbitrary manner. Thus, the exogenous input $u_M$ can be equal to any arbitrary value c[k] that the attacker wants:

$$u_M[k] = c[k] \quad (9)$$

Note that the choice of keeping the matrix D fixed and leaving the exogenous inputs $u_M$ unspecified also models the case in which the malicious attacks modify some entries of the adjacency matrix of the network topology, as in the case of unreliable communication channels.

I. Secure Distributed Control Methodology

Figure 2:
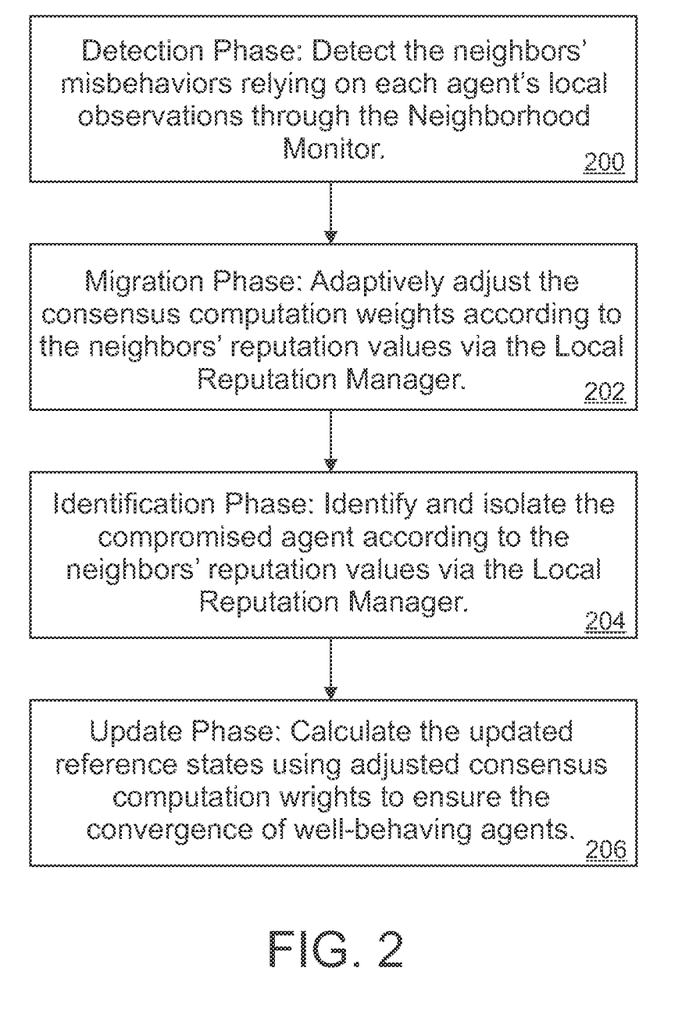
FIG. 2 is a flowchart of an example method for secure distributed control in accordance with embodiments of the present disclosure.

FIG. 2 illustrates a flowchart of an example method for secure distributed control in accordance with embodiments of the present disclosure. The method may generally be implemented in four phases. The phases may be embedded into each iteration of the consensus computation process (i.e., reference state update). Referring to FIG. 2, the method includes detecting neighbors' misbehaviors relying only on each agent's local observations through a neighborhood monitor (block 200). Further, the method includes adjusting consensus computation weights according to the neighbors' reputation values via a local reputation manager (block 202). The method also includes identifying and isolating the compromised agents (block 204). The method also includes using the adjusted consensus computation weights to calculate the updated reference state and ensure the convergence of the well-behaving agents (block 206). The detailed description of each phase follows.

A. Detection Phase

As referred to herein, a neighborhood monitor is an embedded monitor within an agent that the agent to observe the behaviors of its neighbor agents. For example, a neighborhood monitor may be implemented by a processor and memory in one of the agents 102 shown in FIG. 1. In the phase shown in block 200 of FIG. 2, with the assumption that listening to a neighbor's transmission is possible due to the characteristics of wireless communications, each agent 102 may construct a neighborhood monitor to observe its neighbors and learn from them by eavesdropping on the transmissions of the one-hop neighbors within its communication range. For example, if robot A is within range of robot B, A can overhear communications to and from robot B.

In the neighborhood monitor, the agent may carry out a real-time anomaly detection mechanism for all its neighbors. The agent redundantly may calculate and store its neighbor agent j's reference state $r_j$ and compares it with the state value $z_j$ received from neighbor agent j in time step k. If $r_j[k] - z_j[k] \leq \gamma(k, \delta)$, the neighbor is normal; if $r_j[k] - z_j[k] > \gamma(k, \delta)$, the neighbor has a potential anomaly.

$$G_{ij}[k] = \begin{cases} G_{ij}[k-1] + 1, & r_j[k] - z_j[k] \leq \gamma(k, \delta) \\ G_{ij}[k-1], & r_j[k] - z_j[k] > \gamma(k, \delta) \end{cases}, \quad (10)$$

where $G_{ij}$ is the total number of verifiably correct agent states of neighbor agent j up to time step k monitored by agent i. $\gamma(k, \delta)$ is a threshold function that depends on the time step and the disturbance $\delta$.

B. Mitigation Phase

As referred to herein, a reputation manager is an onboard system for an agent 102 that can update or adjust a reputation level of neighbor agents. For example, the agent may update reputation values of the neighbor agents and record them in its local reputation table. Referring to FIG. 2, the reputation manager may adaptively adjust consensus computation weights according to the neighbors' reputation values via the location reputation manager.

As an example, reputation may be an index for the credibility of a node 102 in the network. Here, the reputation metric may be used to quantitatively measure the credibility of the neighbor agents. If misbehaviors of one neighbor agent are detected, the neighborhood monitor then reports to the local reputation manager. The Bayesian Reputation function may be used to calculate the reputation values. Given a set of verifiably correct and incorrect behaviors from a neighbor agent, the probability distribution of seeing a particular combination of correct and incorrect behaviors from this neighbor agent satisfies a beta distribution. The expected value of the beta distribution forms the reputation. This value is given by the ratio of the number of correct agent states received to the number of total agent states received:

$$rep_{ij}[k] = \frac{\eta G_{ij}[k] + 1}{\eta k + 2}, \quad (11)$$

where $rep_{ij}$ is the reputation value of neighbor agent j up to time step k in agent i's local reputation manager. η is the reputation coefficient that can adjust the changing speed of the reputation value regarding to different applications.

In the mitigation phase, if the result of the neighborhood monitor is a misbehavior or good behavior, it may be used to update the neighbor agent's reputation value in each agent's local reputation manager.

C. Identification Phase

At block 204, the method includes identifying and isolating comprised agents according to the neighbors' reputation values via the location reputation manager. For example, the reputation value falls below a certain level (i.e., malicious threshold $rep_{th}$), the corresponding neighbor agent is identified as a compromised agent and is then isolated. In this case, all the information from the compromised neighbor agent is rejected. Nevertheless, a timeout mechanism may be used to allow the compromised agent to rejoin the network or if it has been falsely accused in the past or if it behaves normally again. The reputation manager acts as a confirmation mechanism that one agent is confirmed as misbehaving if it is detected with abnormal values repeatedly during a certain period of time. If this occurs, it is interpreted as the agent's reputation value dropping below the malicious threshold.

For any warning and intrusion detection mechanism, there is essentially a trade-off between the false reject rate (FRR) and the false accept rate (FAR). In the presently disclosed methodology, the design preferences are embodied in the threshold functions and in the reputation coefficient η.

D. Update Phase

The method of FIG. 2 includes calculating the updated reference states using adjusted consensus computation weights to ensure the convergence of well-behaving agents (block 206). For example, in order to embed the above security mechanisms in the consensus computation process, an update phase is proposed to adaptively update the consensus computation weights $d_{ij}$, which is the (i, j) entry of the row-stochastic matrix D, based on the reputation values from the local reputation manager. The method is shown as:

$$d_{ij}[k] = rep_{ij}[k] \bigg/ \sum_{j=1}^{n} rep_{ij}[k]. \quad (12)$$

Thus, the reference state update rule in the consensus manager is correspondingly changed to:

$$z_i[k+1] = \sum_{j=1}^{n} d_{ij}[k] z_j[k], \, i = 1, \dots, n. \quad (13)$$

Figure 3:
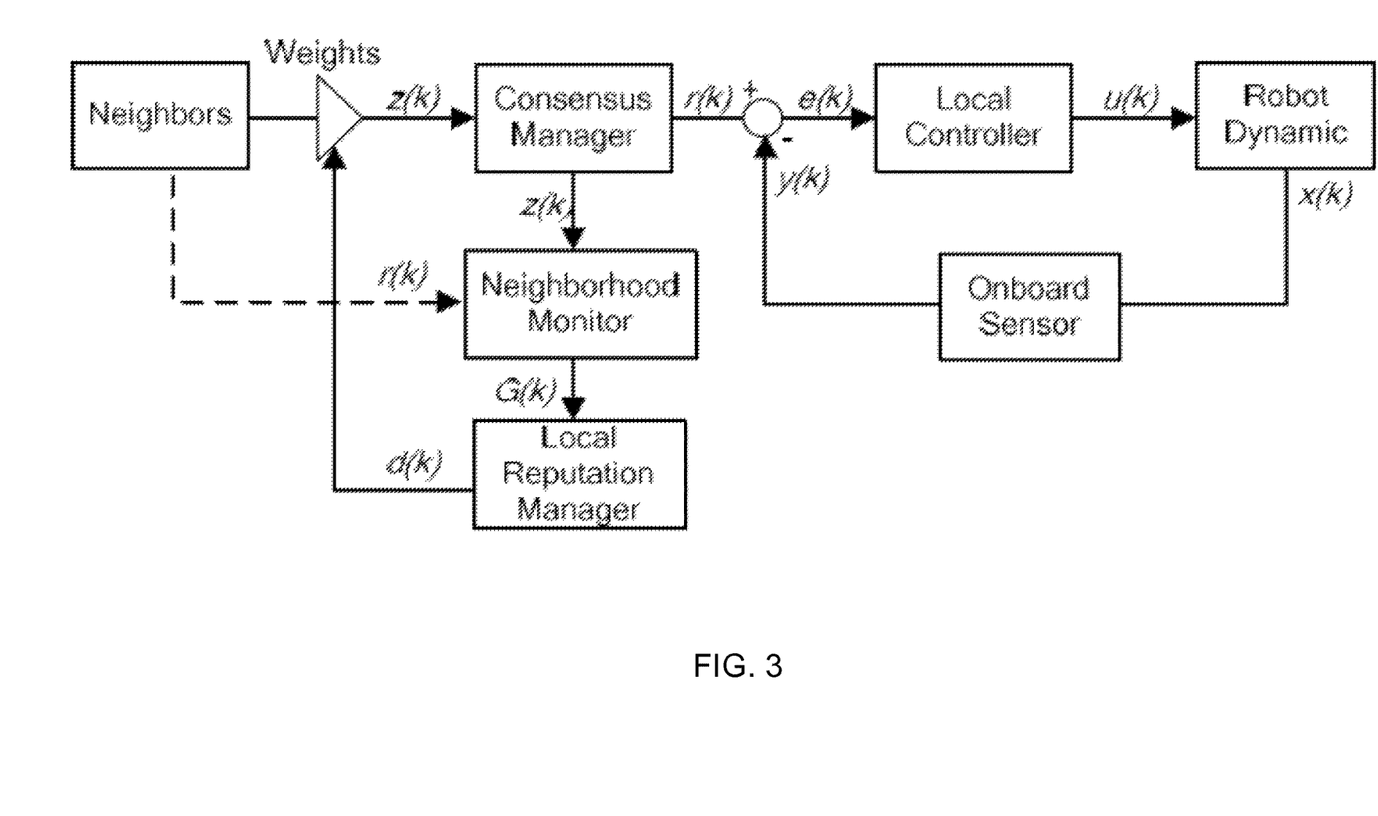
FIG. 3 is a control diagram of a secure distributed control methodology in accordance with embodiments of the present disclosure.

FIG. 3 illustrates a control diagram of a secure distributed control methodology in accordance with embodiments of the present disclosure. By implementing this method, a feedback loop is provided from the security mechanism to the input of the distributed controller (consensus manager).

In this secure distributed control methodology, if the neighbor agent's reputation drops, the consensus manager can gradually decrease the corresponding consensus computation weights, $d_{ij}$, to slow down the speed at which the malicious effects of that potentially compromised agent spreads. If a neighbor agent is identified as a compromised node, the consensus manager will set the corresponding $d_{ij}$ to zero to cut off the connection. Since every agent 102 performs this adaptive consensus computation in parallel, the well-behaving agents finally can isolate the compromised agent and converge to a steady state.

II. Convergence Analysis

Definition (Asymptotic Consensus): The system is said to reach asymptotic consensus if $|x_i[k] - x_j[k]| \to 0$ as $k \to \infty$, for all $i, j \in V$.

A. Convergence Proof

Lemma:

If the total number of misbehaving agents is less than the connectivity of the network, the entire network may not be disconnected due to the isolation of some critical nodes being compromised. In other words, if there is always a spanning tree associated with the updating matrix D, the consensus of the well-behaving nodes can be achieved asymptotically.

Proof:

First, we need the following lemmas are utilized to derive our proof.

Lemma 1:

The discrete linear consensus algorithm achieves asymptotic consensus if, and only if, $$D[k-1]D[k-2] \dots D[2]D[1]D[0] \to 1c^T. \quad (14)$$

As $k \to \infty$, where 1 denotes the n×1 column vector with all the entries equal to 1 and c is an n×1 vector of constant coefficients.

Lemma 2:

A stochastic matrix P is called indecomposable and aperiodic (SIA) if $\lim_{n \to \infty} P^n = 1y^T$.

Lemma 3:

If the union of a set of directed graphs $\{G_1, G_2, \dots, G_m\}$ has a spanning tree, then the matrix product $D_m D_{m-1} \dots D_2 D_1$ is SIA, where $D_i$ is a stochastic matrix with positive diagonal entries corresponding to each directed graph $G_i$.

In a secure distributed control methodology in accordance with embodiments, at each time step $k \in N$, each node communicates with its neighbors and updates its local value. This may be achieved using equations (12) and (13), where $d_{ij}[k]$ is the weight assigned to node j's value by node i at time step k.

$$\text{Since } d_{ij}[k] = \frac{rep_{ij}[k]}{\sum_{j=1}^{|V_i|} rep_{ij}[k]} \geq \frac{rep_{th}}{\sum_{j=1}^{|V_i|} rep_{ij}[k]} \geq \frac{rep_{th}}{|V_i|},$$

where $V_i$ is the set of neighboring nodes of the $i^{th}$ node, and it is seen that there exists a constant $\alpha \in R$, $0 < \alpha < 1$ such that all of the following conditions hold:

$d_{ii}[k] \geq \alpha, \forall i, k$ $d_{ij}[k] = 0$ if $j \notin V_i[k]$, $\forall i, j, k$ $d_{ij}[k] \geq \alpha$ if $j \in V_i[k]$, $\forall i, j, k$ $$\sum_{j=1}^{n} d_{ij}[k] = 1, \, \forall \, i, k$$

where $$\alpha = \frac{rep_{th}}{|V_i|}.$$

Thus, it is shown that D[k] is a stochastic matrix with positive diagonal entries ∀k. The lower bound α on the weights is imposed to guarantee convergence.

Also, it is assumed that the connectivity of the network is m. Since the total number of misbehaving agents is less than the connectivity of the network, the maximum number of malicious nodes is m−1. Even if all the m−1 malicious nodes are isolated in the worst case scenario, the entire network (except for the isolated misbehaving nodes) is still connected. Thus, there is still a spanning tree in the graph that is associated with the rest of the well-behaving nodes.

In conclusion, there may always be a spanning tree in the graph containing the well-behaving nodes associated with the updating matrix D, which is a stochastic matrix with positive diagonal entries. According to lemmas 1, 2, and 3, all the well-behaving nodes (except for the isolated misbehaving nodes) will achieve consensus asymptotically.

B. Convergence and Robustness Analysis

Through observations, it has been discovered that if a misbehaving agent is detected and isolated, it may separate the network into two parts (in some certain network topologies), where there is may be little hope for any consensus algorithm to be working Thus, before the misbehaving agent is removed from the network, the network's topology may be checked—more specifically, the connectivity of the network—to avoid a disconnection in the network. For example, if one misbehaving agent is identified in the network and the entire topology of the network is unknown, it must be that the network is at least 2-connected before that agent is isolated.

To summarize, generally, the presently disclosed algorithm (or any secure control algorithm with an isolation scheme) may work under the assumption that the total number of misbehaving agents is less than the connectivity of the network in the worst case. Otherwise, the entire network may be disconnected because of the isolation of some critical nodes that are being compromised. In general, all the security algorithms using isolation are worst-case bounded by the connectivity of the network. If the connectivity of the network is m, the maximum number of malicious nodes that these algorithms can tolerate is m−1 in the worst case.

III. Recovery Analysis

For a leader-follower consensus network, the task of security may be to detect, identify, and isolate the misbehaving agents so that they have no impact on the well-behaving agents since all the well-behaving agents can eventually converge to the final state of the leader. In a leaderless consensus network, if it is assumed that a misbehaving agent can be isolated (using the proposed secure distributed control methodology), the well-behaving agents can still converge to a steady state. However, this state may be different from the desired final state (e.g., average value of the initial state of all the well-behaving agents). This is because the contribution of the misbehaving agent before isolation has already affected the consensus computation.

In order to eliminate the total contribution from of a misbehaving agent in a leaderless consensus network, rather than just isolating the misbehaving agent from the network to cancel out the misbehaving agent's effect on the network after isolation, the agent's total effect may be compensated from the time it was compromised onward until isolation. So, for the leaderless consensus network, a recovery phase may be added to the secure control methodology after the four regular phases. This fifth phase is to remove the impact of the misbehaving agents by applying recovery schemes.

Two types of recovery schemes are disclosed herein for different applications: rollback recovery and excitation recovery.

A. Rollback Recovery

The rollback recovery scheme may provide that all the agents periodically save their fault-free states (e.g., the initial states) as checkpoint states. When a misbehaving agent is identified and isolated, all the well-behaving agents may restore their states to the checkpoint states by rolling back to their fault-free states. Then, they can converge to the correct steady state through consensus computation. The rollback recovery scheme is suitable for static distributed control applications such as parallel computing and wireless sensor networks since the agent states are easy to reset in these cases.

B. Excitation Recovery

In dynamic distributed control scenarios such as multi-robot formation control, the agent states cannot be reset or rolled back because of the physical constraints. An intuitive solution is to apply extra excitations locally to each agent to compensate the compromised agents' effect from the time when they were compromised until isolation. An example, excitation recovery scheme may include the following steps:

1) At time $k=k_1$, all the agents start to record and update the information $\Sigma_{k=k_1}^{n} d_{ij}(k)[x_i(k)-x_j(k)]$ from all of their neighbors in every iteration.

2) At time $k=k_2$, the compromised agent is identified as compromised and isolated by the secure distributed control methodology. The neighboring agents of the compromised agent apply an external recovery control input $u_{rec}(k)$ such that from time $k=k_2$ to time $k=k_3$, $$\sum_{k=k_2}^{k_3} u_{rec}(k) = -\sum_{k=k_1}^{k_2} d_{ij}(k)[x_i(k) - x_j(k)]. \quad (15)$$

3) After a finite number of iterations at time $k=n$, a recovery of the correct weighted average of the states of the well-behaving agents can be performed if all the well-behaving agents are still connected.

As can be seen, the accuracy of the final convergence value of this excitation recovery scheme may depends on $k_1$ (when it starts to record the neighbors' information). If $k_1 32 0$, the convergence value may be the correct weighted average of the initial states of the well-behaving agents. However, each agent may need to record the contribution of both well-behaving and misbehaving agents before the misbehaver is detected, which would become inefficient and resource-consuming. If $k_1$ equals the time when the misbehaving agent is first compromised, then the final steady state may be the weighted average value with the well-behaving agents' initial states and the contribution of misbehaving agent before it is compromised. This may be slightly different from the accurate consensus value. Thus, there is a trade-off between convergence accuracy and algorithm efficiency. A different priority may be preferred by setting an appropriate record starting time, $k_1$, for different scenarios/applications.

IV. Simulation Results

To analyze the performance of the proposed secure distributed control methodology with recovery schemes, rollback recovery and excitation recovery schemes were applied to two different distributed control applications respectively: wireless sensor networks and multi-robot formation control.

A. Wireless Sensor Network

In this task, eight fully connected temperature sensors were used to measure the average temperature of an area. The readings of all the sensors are shown in Table I and let us assume Sensor 5 and Sensor 6 are malfunctioning under attack.

TABLE I

READINGS OF THE TEMPERATURE SENSORS

| Sensor 1 | Sensor 2 | Sensor 3 | Sensor 4 | Sensor 5 | Sensor 6 | Sensor 7 | Sensor 8 |
|---|---|---|---|---|---|---|---|
| 30 | 27 | 25 | 35 | 40 | 38 | 32 | 31 |

Figure 4A:
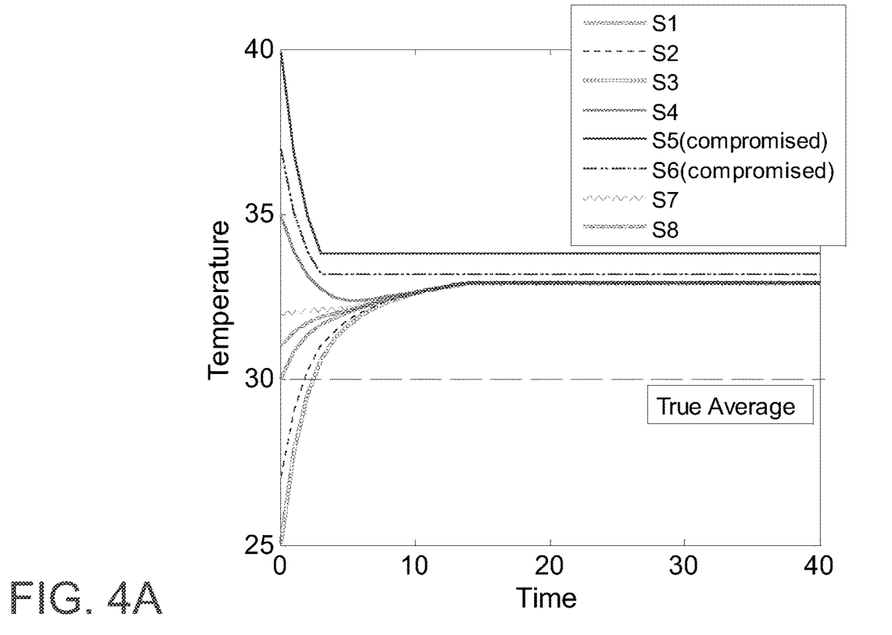
FIGS. 4A and 4B are simulation results of the average consensus with two compromised sensors using the secure distributed control methodology without rollback recovery and with rollback recovery, respectively.
Figure 4B:
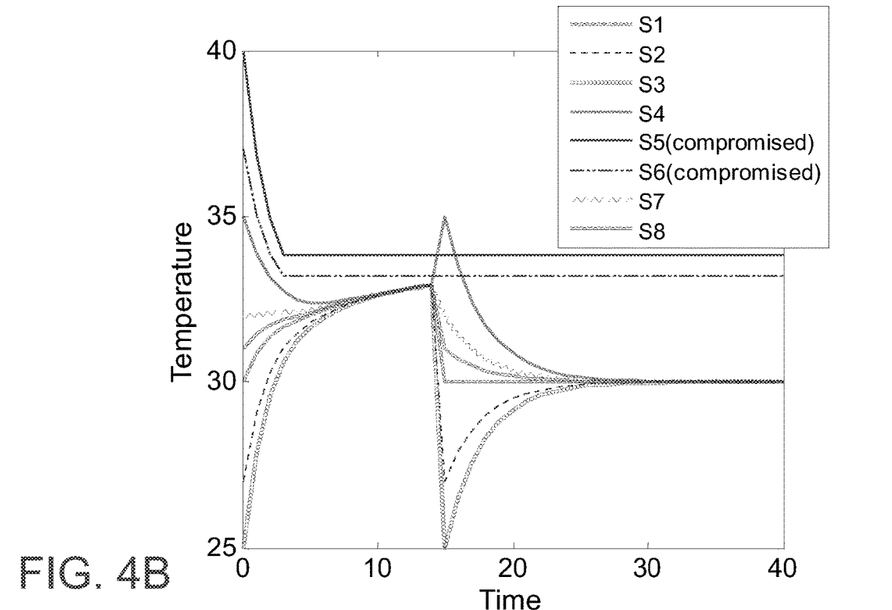

Since the readings of the sensors are static, the rollback recovery scheme is used in this comparative case study. Referring to FIGS. 4A and 4B, the figures show the simulation results of the average consensus with two compromised sensors using the secure distributed control methodology without rollback recovery and with rollback recovery, respectively. As can be seen, without a recovery scheme, the convergence value 32.9° C. is different from the desired true average of the good sensor readings: 30° C. due to the contribution of two compromised sensors before isolation. In contrast, all the good sensors can finally converge to the correct average value by rolling back to their initial states after isolating the compromised sensors. This validates the effectiveness of the rollback recovery scheme.

B. Multi-Robot Formation Control

A representative formation control task, a 1-D rendezvous, is designed: Let all six robots stay in a line in parallel (reach the same x-coordinate which that is the average of their initial positions). Since leaderless consensus network is applied, the communications topology is set to be fully connected. Robot 5 is the misbehaving robot and is being compromised at k=5. The initial positions of all the robots are shown in Table II.

TABLE II

INITIAL POSITIONS (X-COORDINATES) OF THE ROBOTS

| Robot 1 | Robot 2 | Robot 3 | Robot 4 | Robot 5 | Robot 6 |
|---|---|---|---|---|---|
| 120 | 0 | 80 | 10 | 100 | 50 |

Figure 5A:
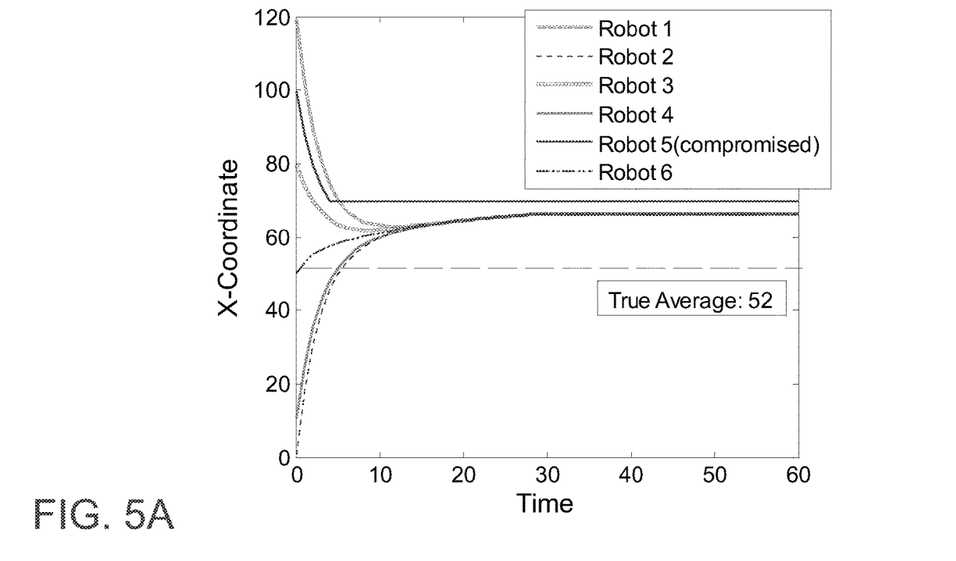
FIGS. 5A and 5B are graphs of multi-robot formation control results using the proposed secure distributed control methodology in the presence of a compromised robot without excitation recovery and with excitation recovery, respectively.
Figure 5B:
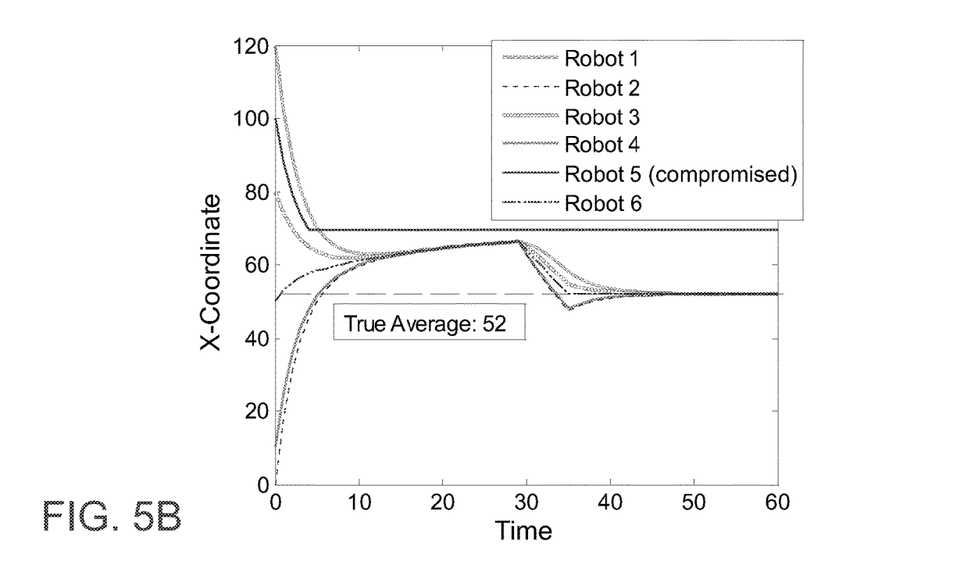

Excitation recovery is used in this formation control case study, and the parameter settings are: $k_1=0$, $k_2=30$, and $k_3=35$. The rendezvous task is carried out using the proposed secure distributed control methodology to perform the consensus computation both with and without excitation recovery for comparison. As the simulation results shown in FIGS. 5A and 5B, without excitation recovery, Robot 5 drags the entire team away from the desired rendezvous point even as it is detected and isolated from the network eventually. FIGS. 5A and 5B show graphs of multi-robot formation control results using the proposed secure distributed control methodology in the presence of a compromised robot without excitation recovery and with excitation recovery, respectively. However, by applying the excitation recovery scheme, the neighboring robots apply the recovery input locally after disconnecting the compromised agent, and then all the well-behaving robots converge at the correct destination asymptotically. The convergence may be guaranteed as long as the topology satisfies the sufficient conditions of the average consensus algorithm.

The present subject matter is a platform technology that can be applied in many industrial applications, such as, but not limited to: (1) Supervisory Control and Data Acquisition (SCADA) systems in critical infrastructures (e.g., power grid, gas and water distribution systems); (2) wide area monitoring and energy management in power systems; (3) traffic management in intelligent transportation systems; (4) electric vehicle charging management in a municipal parking deck or a community environment; and (5) mobile devices monitoring and management in an aggregate level.

The present subject matter may be a system, a method, and/or a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present subject matter have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method comprising:
   determining, by a processor, a consensus computation weight at a plurality of modules in a computer network;
   detecting, by the processor, an anomaly at a module among the plurality of modules in the computer network;
   decreasing, by the processor, the consensus computation weight of the module associated with the detected anomaly to reduce a malicious effect to a second module among the plurality of modules with the computer network;
   adjusting, by the processor, a reputation level of the module associated with the decreased consensus computation weight of the module associated with the detected anomaly in parallel with the plurality of modules in the computer network;
   determining, by the processor, that the computer network would remain connected upon isolating the module associated with the detected anomaly;
   isolating, by the processor, the module associated with the detected anomaly in the computer network based on the adjusted reputation level of the module associated with the detected anomaly; and
   controlling interaction of the module associated with the detected anomaly within the network based on the adjusted reputation level.

2. The method of claim 1, wherein detecting an anomaly comprises:
   determining states of the modules; and
   comparing the states of the modules to determine anomaly behavior of one of the modules.

3. The method of claim 1, wherein detecting an anomaly comprises detecting behaviors among the modules that are indicative of one of a cyber attack and a malicious operation among neighboring modules.

4. The method of claim 1, further comprising receiving information about availability of one of communication links and information flows with one or more neighboring modules, and
   wherein detecting an anomaly comprises detecting the anomaly based on the one of the communication links and information flows.

5. The method of claim 1, wherein controlling interaction of the module comprises isolating the module from the network based on the reputation level.

6. The method of claim 1, further comprising restoring the consensus computation weight of the module when the anomaly is not detected.

7. The method of claim 1, further comprising determining whether the reputation level of the module associated with the detected anomaly is below a predetermined level, and
   wherein controlling interaction of the module comprises rejecting information from the module in response to determining that the reputation level is below the predetermined level.

8. A system comprising:
   at least a processor and memory configured to:
   determine a consensus computation weight at a plurality of modules in a computer network;
   detect an anomaly at a module among the plurality of modules in the computer network;
   decrease the consensus computation weight of the module associated with the detected anomaly to reduce a malicious effect to a second module among the plurality of modules within the computer network;
   adjust a reputation level of the module associated with the decreased consensus computation weight of the module associated with the detected anomaly in parallel with the plurality of modules in the computer network;
   determine that the computer network would remain connected upon isolating the module associated with the detected anomaly;
   isolate the module associated with the detected anomaly in the computer network based on the adjusted reputation level of the module associated with the detected anomaly; and
   control interaction of the module associated with the detected anomaly within the network based on the adjusted reputation level.

9. The system of claim 8, wherein the at least a processor and memory are configured to:
   determine states of the modules; and
   compare the states of the modules to determine anomaly behavior of one of the modules.

10. The system of claim 8, wherein the at least a processor and memory are configured to detect behaviors among the modules that are indicative of one of a cyber attack and a malicious operation among neighboring modules.

11. The system of claim 8, wherein the at least a processor and memory are configured to:
    receive information about availability of one of communication links and information flows with one or more neighboring modules; and
    detect the anomaly based on the one of the communication links and information flows.

12. The system of claim 8, wherein the at least a processor and memory are configured to isolate the module from the network based on the reputation level.

13. The system of claim 8, wherein the at least a processor and memory are configured to restore the consensus computation weight of the module when the anomaly is not detected.

14. The system of claim 8, wherein the at least a processor and memory are configured to:
    determine whether the reputation level of the module associated with the detected anomaly is below a predetermined level; and
    reject information from the module in response to determining that the reputation level is below the predetermined level.

15. A computer program product comprising a non-transitory computer readable storage medium having program instructions embodied therewith, the program instructions readable by a computing device to cause the computing device to:
    determine, by the computing device, a consensus computation weight at a plurality of modules in a computer network;
    detect, by the computing device, an anomaly at a module among the plurality of modules in the computer network;
    decrease, by the computing device, the consensus computation weight of the module associated with the detected anomaly to a malicious effect to a second module among the plurality of modules with the computer network;
    adjust, by the computing device, a reputation level of the module associated with the decreased consensus computation weight of the module associated with the detected anomaly in parallel with the plurality of modules in the computer network;
    determine, by the computing device, that the computer network would remain connected upon isolating the module associated with the detected anomaly;
    isolate, by the computing device, the module associated with the detected anomaly in the computer network based on the adjusted reputation level of the module associated with the detected anomaly; and
    control, by the computing device, interaction of the module associated with the detected anomaly within the network based on the adjusted reputation level.

16. The computer program product of claim 15, wherein the program instructions are readable by the computing device to cause the computing device to:
    determine, by the computing device, states of the modules; and
    compare, by the computing device, the states of the modules to determine anomaly behavior of one of the modules.

17. The computer program product of claim 15, wherein the program instructions are readable by the computing device to cause the computing device to detect behaviors among the modules that are indicative of one of a cyber attack and a malicious operation among neighboring modules.

18. The computer program product of claim 15, wherein the program instructions are readable by the computing device to cause the computing device to:

receive information about availability of one of communication links and information flows with one or more neighboring modules; and detect the anomaly based on the one of the communication links and information flows.

19. The computer program product of claim 15, wherein the program instructions are readable by the computing device to cause the computing device to isolate the module from the network based on the reputation level.

20. The computer program product of claim 15, wherein the program instructions are readable by the computing device to cause the computing device to:

determine whether the reputation level of the module associated with the detected anomaly is below a predetermined level; and reject information from the module in response to determining that the reputation level is below the predetermined level.

\* \* \* \* \*

UNITED STATES PATENT AND TRADEMARK OFFICE
CERTIFICATE OF CORRECTION

PATENT NO. : 9,910,982 B2
APPLICATION NO. : 14/889840
DATED : March 6, 2018
INVENTOR(S) : Mo-Yuen Chow and Wente Zeng Page 1 of 1

It is certified that error appears in the above-identified patent and that said Letters Patent is hereby corrected as shown below:

In the Specification

Please replace the third paragraph with the following amended paragraph:
--This invention was made with government support under grant number 0823952 awarded by the National Science Foundation. The United States government has certain rights in the invention.--

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*